United States Patent [19]

Forsten

[11] Patent Number: 4,536,439
[45] Date of Patent: Aug. 20, 1985

[54] LIGHT WEIGHT FILTER FELT

[75] Inventor: Herman H. Forsten, Hockessin, Del.

[73] Assignee: E. I. Du Pont de Nemours and Company, Wilmington, Del.

[21] Appl. No.: 689,164

[22] Filed: Jan. 7, 1985

[51] Int. Cl.³ .............................................. D04H 1/08
[52] U.S. Cl. ..................................... 428/280; 28/104; 28/112; 55/528; 428/299
[58] Field of Search ....................... 428/280, 299, 300; 28/112, 104; 55/528

[56] References Cited

U.S. PATENT DOCUMENTS

| 3,508,308 | 4/1970 | Bunting et al. | 428/227 |
| 4,100,323 | 7/1978 | Forsten | 428/280 |
| 4,117,578 | 10/1978 | Forsten | 428/280 |

Primary Examiner—James J. Bell

[57] ABSTRACT

Nonwoven fabrics of poly(m-phenylene isophthalamide) having a cross-machine modulus greater than 40, and good resistance to abrasion that is useful as a gas filtration substrate, and the process of producing such a fabric by heating an entangled web while stretching the fabric transversely 5 to 15% for a time sufficient to increase the crystallinity index at least about 0.05 units.

3 Claims, 1 Drawing Figure

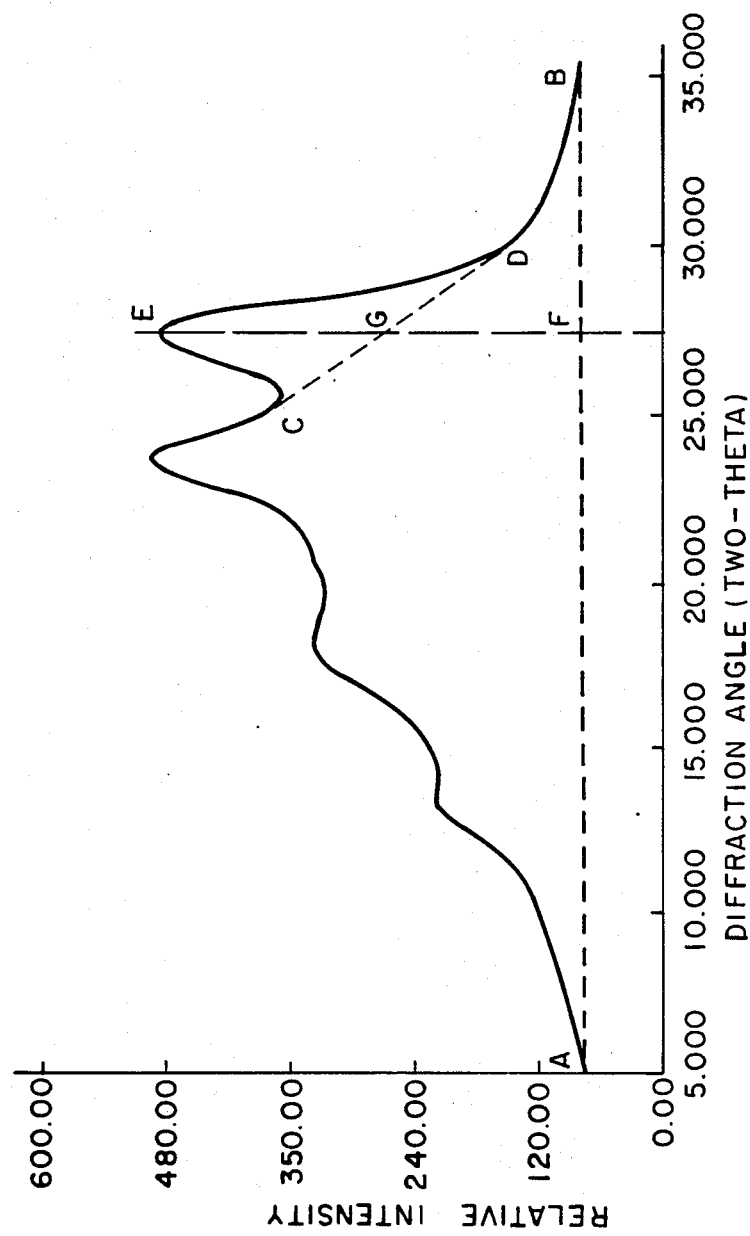

LIGHT WEIGHT FILTER FELT

FIELD OF THE INVENTION

This invention relates to a non-woven fabric that may be used as filter felt to remove particulate matter from a gas stream. This invention also relates to a process of producing a non-woven fabric that has a high modulus, high gas permeability, high resistance to abrasion, and is resistant to damage by exposure to high temperature gas.

BACKGROUND OF THE INVENTION

Filter felts made from poly(m-phenylene isophthalamide) are known in the art and are disclosed, for example, in Forsten U.S. Pat. No. 4,100,323.

It is also known to make fabrics of poly(m-phenylene isophthalamide) by hydraulically entangling staple fibers—see for example, Research Disclosure, 12410, August 1974.

It is also known to process fabrics of poly(m-phenylene isophthalamide) which were made by hydraulically entangling staple fibers by heating the fabric at high pressure with calender rolls—see Research Disclosure, 13002, February 1975.

One widely used commercial design for removing particulate matter (dust) from gas streams utilizes a method which has been designated as the "outside bag" dust collection principle. In this design, dust-containing gas flows into a large compartment containing a plurality of long, substantially cylindrical filter bags, each bag being suspended by its ring-shaped top. A cylindrical wire cage internally supports the bag and prevents collapse of the filter bag when the gas is flowing into it. The dust collects around the outside of the bag, while the cleaned gas flows into and upward through the bag and out the top of the bag into the clean air outflow conduits. The dust collected on the outside surface of the bag is periodically removed by releasing a split-second reverse-flow pulse of compressed air into the top of the bag. The compressed air travels down the length of the bag, causing it to expand. When the pulse of reverse-flow air is stopped, the bag contracts against the cylindrical wire support cage. The expansion and contraction of the bag causes the collected particles to fall off the bag and be collected. The pulses of reverse-flow air cause the bag to "grow" (increase in area of the fabric) over a number of cycles. The contraction against the cage causes the bag to abrade, and the abrasion becomes more severe as the bag grows. The pulse of reverse-flow air is usually applied to one bag at a time in sequence so that the main flow of dust-containing air into the baghouse and clean air flow from it are not interrupted.

BRIEF DESCRIPTION OF THE INVENTION

It has now been found that a lighter weight, stronger, more abrasion-resistant fabric can be produced from poly(m-phenylene isophthalamide), that is useful as a filter felt in the filtration of hot gas streams containing particulate matter. The fabrics are especially useful in forming filter bags that are to be internally supported and used in bag houses.

The fabrics of the invention consist essentially of entangled staple fibers of poly(m-phenylene isophthalamide) having a length of 1 to 5 cm. The fibers in the fabric have a crystallinity index of at least about 0.50. The fabric has a basis weight of between 200 and 350 g/m$^2$, and an air permeability of 12 to 30 m$^3$/min/m$^2$, a cross-machine-direction modulus of greater than 40 Kg/cm$^2$, and an abrasion resistance such that it will go through at least 500 cycles before failure in the Taber abrasion test. The machine-direction modulus of the fabrics of the invention usually is greater than the cross-machine-direction modulus.

The fabrics of the invention can be produced by hydraulically entangling a fiber batt consisting essentially of staple fibers having a length of 1 to 5 cm of poly(m-phenylene isophthalamide), said staple fibers having a crystallinity index of at least 0.4, heating the fabric while it is under low or no compressive forces in the thickness dimension to a temperature in the range of 260° to 360° C. while maintaining the length of the fabric and while transversely stretching the fabric 5 to 15% of its original width, said heating taking place for a time sufficient to increase the crystallinity index at least about 0.05 units. The fiber batt prior entanglement should have a basis weight of about 5 to 15% higher than the final basis weight desired in the fabric.

DETAILED DESCRIPTION OF THE INVENTION

Hydraulically entangling of fibers to form a fabric is also known as hydraulic needling and the resulting fabrics are known as spunlaced fabrics. The fabric of the present invention is a nonapertured (non-patterned) fabric made by the process described generally by Bunting et al in U.S. Pat. No. 3,508,308 and more specifically by Hwang in his U.S. patent application Ser. No. 568,171, filed Jan. 5, 1984. In making the fabrics of this invention, poly(m-phenylene isophthalamide) staple fibers having a cut length of 1 to 5 cm are employed, the staple fibers having a crystallinity index of at least about 0.45. The staple fibers are carded, cross-lapped, and made into a batt by a staple air-laydown process of the type described by Zafiroglu in his U.S. Pat. No. 3,797,074. The batt so formed is given a light hydraulic needling to consolidate it and is then repeatedly hydraulically needled at higher water pressures alternately from the top and the bottom of the web.

The cross-machine-direction modulus and machine-direction modulus are determined in accordance with ASTM Method D-1682-64, except that instead of being broken in 20±3 seconds, the specimens are elongated at a 40%/min rate of extension. The tensile tester (Instron Tester, Instron Corp., Canton, Mass.) is equipped with upper and lower air-actuated clamps having 1 in×3 in (2.5 cm×7.5 cm) rubber-lined jaw faces. Five specimens are cut 1 in×7.5 in (2.5 cm×19 cm) with the long dimension parallel to the machine direction and five specimens with the same dimensions having the long dimension parallel to the cross-machine direction. The modulus values are reported as the stress to stretch the specimens to 100% elongation, assuming the ratio of change in stress to change in strain in the first straight line portion of the load-elongation curve (following the removal of slack and crimp) remains constant.

Air permeability is measured on a commercially available air permeability machine (such as the air permeability machine manufactured by the Frazier Precision Instrument Company, 210 Oakmont Avenue, Gaithersburg, Md.) in general accordance with Textile Test Method 5450 of U.S. Federal Specification CCC-T-191b.

The term "crystallinity index" is an empirical value calculated from an intensity ratio and is a measure of the degree of crystallinity of a polymer, although it should not be interpreted as being linearly proportional to the amount of crystallinity in the polymer. To determine the crystallinity index of a fabric made of fibers of poly(m-phenylene isophthalamide), a sample of the fabric is positioned in a flat sample holder and an x-ray diffraction pattern is recorded in the normal reflection mode from 5° to 35° (2θ) using a standard power diffractometer equipped with a graphite crystal monochrometer. [The FIGURE represents an x-ray diffraction pattern of poly(m-phenylene isophthalamide fabric).] The diffraction scan of crystalline poly(m-phenylene isophthalamide) contains two prominent peaks at approximately 24° and 27° (2θ), respectively, the greatest intensity change occurring at the crystalline diffraction peak at approximately 27°. To determine the crystallinity index a background baseline substantially tangent to the scan is drawn as a straight line AB from the lower extremity A of the scan at approximately 5° to the upper extremity B of the scan at approximately 35°—see the FIGURE. Next a straight line CD is drawn separating the crystalline peak at approximately 27° from the remainder of the scan, the line CD being drawn tangent to the scan at a tangent point D near 30° on the high-angle side of the 27° crystalline peak and tangent to the scan at a tangent point C near 25° on the low-angle side of the 27° crystalline peak, locating point C at 25.0° on the scan if an obvious tangent point on the scan is not present—see the FIGURE. The line CD so drawn slopes downwardly from the low-angle side. The highest point of the crystalline peak at approximately 27° is then designated as point E. A line perpendicular to the x-axis is drawn through E, intersecting the baseline AB at point F and the line CD at point G. The crystallinity index is defined as the ratio of the distance, EG, to the distance, EF. The calculation is carried out using the formula:

Crystallinity Index = (EG)/(EF).

The Taber abrasion test is carried out in accordance with ASTM Test Method D-1175-64T, page 283 (Rotary Platform, Double Head Method), using CS-10 grit size abrasive wheels applied against the specimen with a load of 500 g per wheel. Failure is judged to occur when a hole of any size passing completely through the sheet can be observed. Results are reported as cycles to failure.

EXAMPLE

Crystalline poly(m-phenylene isophthalamide) fibers, prepared as described in U.S. Pat. No. 3,133,138 to E. L. Alexander, Jr. (available as T-450 Nomex ® aramid fibers from E. I. du Pont de Nemours and Company) were formed into a batt by an air-laydown process of the type described in Zafiroglu U.S. Pat. No. 3,797,074. The batt consisted of 1 in (2.54 cm) staple length fibers of 2 denier (2.2 dtex) and was formed into an 8.6 oz/yd² (292 g/m²) non-apertured, nonwoven fabric by treatment with columnar hydraulic jets.

Different sets of orifices were employed to provide columnar streams of water to the batt, while the batt was supported on screens, under which means were provided for removing the water. The orifices were arranged in rows perpendicular to the direction of batt travel and were located about 1 in (2.54 cm) from the batt surface. Five sets of orifices and five different screens were employed. The orifice diameters and spacing of orifices in these orifice sets were as follows:

| Orifice Set | Orifice Diameter inch (mm) | Number per inch (cm) |
| --- | --- | --- |
| A | 0.007 (0.178) | 5 (2.0) |
| B | 0.007 (0.178) | 10 (3.9) |
| C | 0.007 (0.178) | 20 (7.9) |
| D | 0.005 (0.127) | 40 (15.7) |
| E | 0.005 (0.127) | 20 (7.9) |

Orifice set A, B, C, and E had orifices located in a single row but in Set D the orifices were located in two staggered rows spaced 0.04 in (0.10 cm) apart with each row containing 20 orifices/in (7.9/cm).

The different wire mesh support screens employed in the example were constructed as follows:

| Screen | Wires per inch (cm) | | % Open Area |
| --- | --- | --- | --- |
| A | 100 × 96 | (39.3 × 37.8) | 21 |
| B | 75 × 58 | (29.5 × 22.8) | 21 |
| C | 40 × 36 | (15.7 × 14.2) | 36 |
| D | 20 × 20 | (7.9 × 7.9) | 41 |
| E | 50 × 50 | (19.7 × 19.7) | 50 |

Table I summarizes the sequence of jet treatments. The first five rows of jets impacted one face of the batt; the remaining rows, the other face.

TABLE 1

| Orifice Set | Screen Support | Pressure psi (k Pa) |
| --- | --- | --- |
| B | C | 700 (4820) |
| B | C | 700 (4820) |
| A | A | 500 (3450) |
| A | A | 500 (3450) |
| C | A | 2000 (13780) |
| C | D | 600 (4130) |
| C | D | 1100 (7580) |
| C | D | 2000 (13780) |
| C | D | 2000 (13780) |

The total energy expended in the treatment and the energy-impact product are listed in Table II.

TABLE II

| Energy | |
| --- | --- |
| Hp-hr/lb | 0.46 |
| 10⁶ J/kg | 2.71 |
| Energy-Impact Product | |
| Hp-hr lb$_f$/lb$_m$ | 0.039 |
| 10⁶ JN/kg | 1.03 |

The resulting hydraulically entangled nonwoven fabric was heat treated in a forced hot air tenter frame at 288° C. (550° F.) for 120 seconds. While being heat treated, it was stretched 10% in the cross-machine direction. Table III summarizes fabric properties before and after post heat treatment.

TABLE III

| Fabric Property | Before Heat Treatment | After Heat Treatment |
| --- | --- | --- |
| Weight | | |
| oz/yd² | 8.6 | 6.8 |
| g/m² | 292 | 231 |
| Modulus (XD): | | |
| lbs/in² | 380 | 830 |
| Kg/cm² | 26.7 | 58.8 |
| Air Permeability cfm/ft² | 55 | 72 |

TABLE III-continued

| Fabric Property | Before Heat Treatment | After Heat Treatment |
| --- | --- | --- |
| Crystal Index | 0.44 | .51 |
| Thickness mils | 56 | 49 |
| cm | 0.14 | 0.12 |
| Taber Abrasion: cycles to failure | 2330 | 3244 |
| Modulus (MD): | | |
| lbs/in² | 1433 | 1440 |
| Kg/cm² | 100.7 | 101.2 |

Sixty five (65) filtration bags were made from the heat treated, stretched nonwoven fabrics prepared as described above. The bags were about 5 in (12.7 cm) in diameter and 92 in (234 cm) long, each with a closed circular bottom and an open top. At the top of each bag, an annular steel band the same diameter as the bag and 1 in (2.5 cm) deep was covered with the same fabric and sewn to the upper circumference of the bag, so that the top of the bag was continuously held open. These bags are designated below as the "Test Bags". A similar set of 65 filtration bags with the same dimensions, made from a quantity of the same fabric which had not been heat treated and stretched, are designated below as the "Control Bags". Four sets of 65 bags each, designated below as "Conventional Bags", were also employed in the evaluation and were made with the same dimensions from a scrim-reinforced, needle punched felt fabric having a basis weight of 14 oz/yd² (475 g/m²) and which had not been heat set. The scrim was a 2.2 oz/yd² (74 g/m²) basis weight fabric woven in a plain weave construction from crystalline poly(m-phenylene isophthalamide) staple fiber yarns, 18 ends/in (7 ends/cm) of 8/1 cotton count yarns in the wrap and 14 ends/in (5.5 ends/cm) of 17/1 cotton count yarns in the filling. The scrim was used to provide dimensional stability. Batts having a basis weight of about 6 oz/yd² (204 g/m²) of crystalline staple fibers of poly(m-phenylene isophthalamide) having a cut length of 3 in (7.5 cm) were needle-punched on each side of the scrim to form these felt fabrics.

Bags prepared as described above were evaluated in a commercial baghouse to remove rock dust from 325° F. (163° C.) air coming from a drum mixer being used to dry rocks before mixing the rocks with asphalt. The baghouse had six compartments of 65 bags each and operated by the "outside bag" dust collection principle with plenum pulsing. The compartment containing the 65 "Control Bags" exhibited more dust leakage into the effluent air than the other compartments all through the test and had to be shut down after 180 days because of unacceptable leakage. The "Control Bags" were found to have 4% growth. The compartment containing the 65 "Test Bags" and the compartments containing the 65-bag sets of "Conventional Bags" were all performing acceptably after 180 days. The "Test Bags" and "Conventional Bags" each exhibited 1.8% growth at this point. The compartment containing the "Control Bags" was resupplied with "Conventional Bags" and the test was resumed. After 310 days all compartments were still performing acceptably.

In the above example, it is to be noted that the "Test Bags" were made with no reinforcing scrim and had a basis weight of only about half that of the "Conventional Bags". However, the "Test Bags" performed as well in a commercial baghouse as the "Conventional Bags" did.

I claim:

1. A fabric consisting essentially of entangled staple fibers of poly(m-phenylene isophthalamide), said staple fibers having a length of 1 to 5 cm, the fibers having a crystallinity index of at least about 0.50, the fabric having a basis weight of between 200 and 350 g/m², an air permeability of 12 to 30 m³/min/m², a cross-machine-direction modulus of greater than 40 Kg/cm² and an abrasion resistance such that it will go through at least 500 cycles before failure in the Taber abrasion test.

2. The fabric of claim 1 in which the machine-direction modulus is greater than the cross-machine-direction modulus.

3. A process for the production of a non-woven fabric having a high modulus and a high air permeability, and suitable for use in the production of filtration air bags which comprises hydraulically entangling the fibers of a batt consisting essentially of staple fibers having a length of 1 to 5 cm of poly(m-phenylene isophthalamide), said staple fibers having a crystallinity index of at least about 0.4, heating the fabric while the fabric is under low or no compressive forces in the thickness dimension to a temperature in the range of 260° to 360° C. while maintaining the length of the fabric, and while transversely stretching the fabric 5 to 15%, for a time sufficient to increase the crystallinity index at least about 0.05 units.

* * * * *